United States Patent

Kennedy et al.

[11] Patent Number: 6,003,653
[45] Date of Patent: Dec. 21, 1999

[54] ARTICLE GRADING APPARATUS

[75] Inventors: Hamish Nigel Alexander Kennedy; Gavin Brian Reeve; Peter Samuel Short; Philip William Poore, all of Auckland, New Zealand

[73] Assignee: Horticultural Automation Limited, Auckland, New Zealand

[21] Appl. No.: 08/464,647

[22] PCT Filed: Dec. 16, 1993

[86] PCT No.: PCT/NZ93/00126

§ 371 Date: Jul. 27, 1995

§ 102(e) Date: Jul. 27, 1995

[87] PCT Pub. No.: WO94/14547

PCT Pub. Date: Jul. 7, 1994

[30] Foreign Application Priority Data

Dec. 22, 1992 [NZ] New Zealand .......................... 245567

[51] Int. Cl.[6] .................... B65G 37/00; B07C 5/24
[52] U.S. Cl. ................. 198/367; 198/370.04; 209/592; 209/648; 209/912; 177/145
[58] Field of Search ................. 209/592, 593, 209/648, 707, 911, 912; 198/370.03, 370.04, 367; 177/145; 414/384

[56] References Cited

U.S. PATENT DOCUMENTS

| 3,747,755 | 7/1973 | Senturia et al. | 209/559 |
| 4,262,807 | 4/1981 | Leverett | 209/592 |
| 4,403,669 | 9/1983 | Raz | 209/592 |
| 4,426,006 | 1/1984 | Horii et al. | 209/593 |
| 4,787,498 | 11/1988 | Males et al. | 198/802 X |
| 5,244,100 | 9/1993 | Regier et al. | 209/593 X |
| 5,267,654 | 12/1993 | Leverett | 209/592 X |
| 5,335,767 | 8/1994 | Killer et al. | 198/370.04 |
| 5,348,132 | 9/1994 | Maier | 198/370.04 |

FOREIGN PATENT DOCUMENTS

| B-3294589 | 9/1989 | Australia . |
| 0 491 407 A1 | 6/1992 | European Pat. Off. . |
| A3303184 | 8/1983 | Germany . |
| 2197633 | 5/1988 | United Kingdom .............. 198/370.04 |

OTHER PUBLICATIONS

New Zealand Patent Application No. 229363 (pending) dated May 31, 1989.
New Zealand Patent Application No. 223034 (pending) dated Dec. 22, 1987.
New Zealand Patent Application No. 197565 (pending) dated Jun. 29, 1981.
New Zealand Patent Application No. 194845 (pending) dated Sep. 4, 1980.
EP, A 491407–A1 (Abstract) (MAF Material Arboriculture Fruitiere) 24 Jun. 1992.
Japan Abstract, M–129, p. 145, JP,A,57–19221 (Maki Seisakusho K.K.) 1 Feb. 1982.
Japan Abstract, M–129, p. 145, JP,A,57–19222 (Maki Seisakusho K.K.) 1 Feb. Feb. 1982.
Japan Abstract, M–1025, p. 119, JP,A,2–169409 (Maki Seisakusho K.K.) 29 Jun. 1990.
Derwent Abstract Accession No. D8911x/17, SU,A,447328 (Smolyer V Ya) 15 Dec. 1974.

Primary Examiner—Tuan N. Nguyen
Attorney, Agent, or Firm—Merchant, Gould, Smith, Edell, Welter & Schmidt, P.A.

[57] ABSTRACT

A "fruit cup" (1) which is shaped to receive articles, for example single pieces of fruit of produce such as apples. The articles rest in a space on a support between the back plate (7) of a "U" shaped bracket and a rotatable bow-tie roller (2) positioned between the arms (4, 5) of the bracket. The support sits on a mounting to which it is coupled while being allowed limited relative movement therebetween. The relative movement between the support and the mounting allows the support to be tilted, lifting the roller (2), enabling it to be rotated to ensure that the "fruit cup" (1) contains only one article. The support is also able to be tipped to either side, to discharge the article contained therein, and to later be repositioned atop the mounting. In use, the base (13, 14) of the mounting is attached to an endless chain conveyor so that a number of "fruit cups" form an endless circuit in an article grading/packaging/sorting system which may have a number of adjacent circuits.

16 Claims, 3 Drawing Sheets

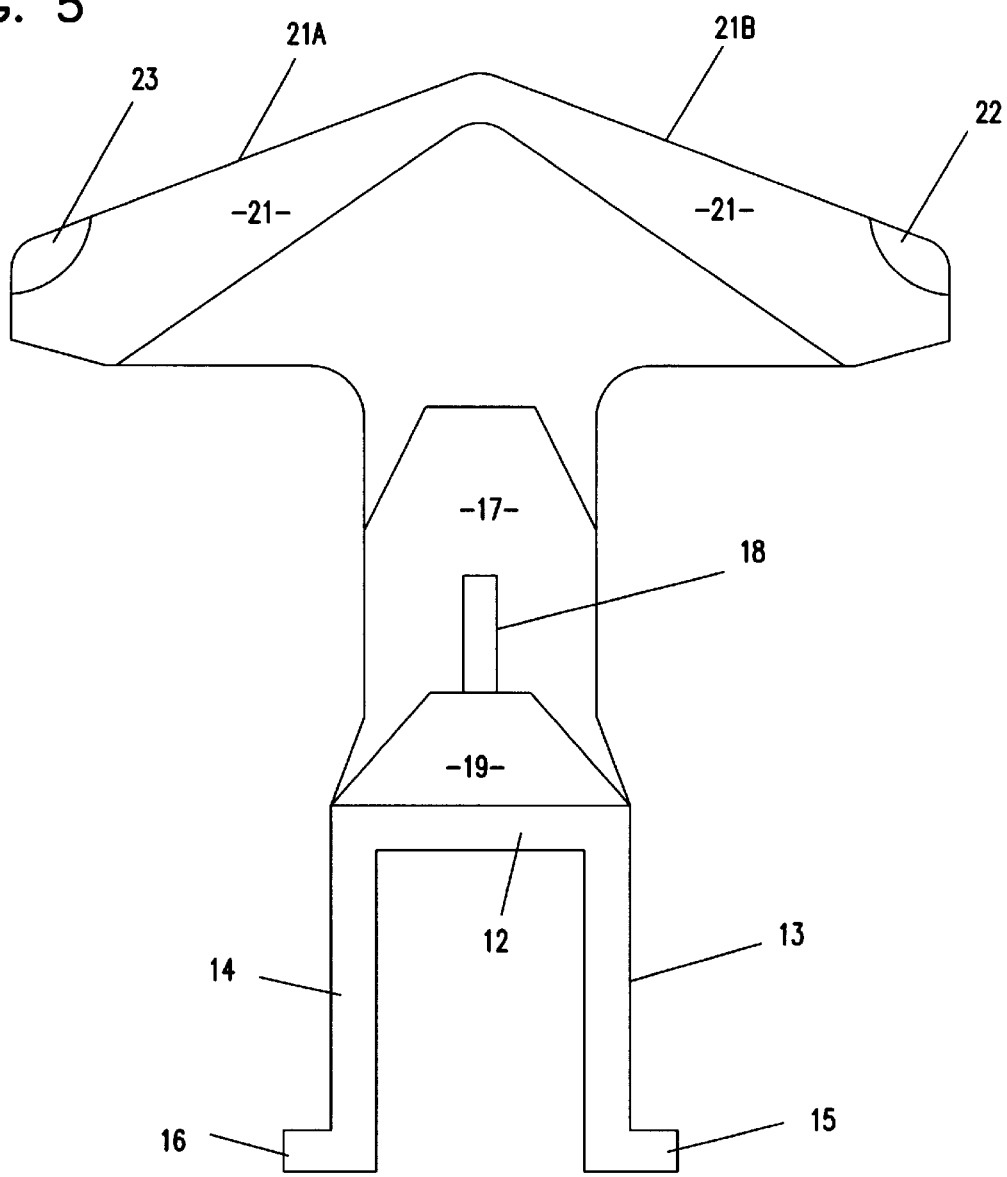

ARTICLE GRADING APPARATUS

TECHNICAL FIELD

This invention relates to article grading apparatus and in particular, but not solely, to fruit and/or vegetable carrying and tipping apparatus used in the grading and/or packaging of fruit and/or vegetables.

BACKGROUND ART

Fruit graders usually comprise an endless circuit of carriers or "cups" on a conveyor chain with the cups situated to unload fruit at stations appropriate to, for example, fruit weight, size, colour or defect type. There are currently two predominant methods of sizing fruit, being weighing and imaging (using a video image to gain information about the fruit). The weighing method requires that the fruit are separated, that is one per cup and that the cup be stable with minimum external forces. The imaging method requires that fruit be rotated between large diameter rollers in order that multiple views may be obtained (especially for non-spherically shaped fruit). Many different designs of cup and their actuating systems are known to the prior art.

One type of cup system has been termed a "back-tipping" cup. An example of this cup type is disclosed in U.S. Pat. No 4,403,669 issued to Raz. A back tipping-cup has an actuating mechanism which allows the fruit in the cup to be dropped backwards, away from the direction the fruit is travelling. This type of system requires that the cup be tipped from horizontal down to almost vertical in order that the produce may be dropped out of the cup. This system also requires a large cup in order that the fruit may fall unimpeded through the gap left by the tipped cup and therefore fewer cups per unit length of conveyor and lower through-put of produce results. The back-tipping method also requires that the produce be dropped from a greater height when compared to some other devices so that the large cup may be swung almost to vertical, increasing damage to the produce.

Another prior art cup system involves side-tipping cups which have a "kicker" or "ejector" incorporated on one side of the cup. An example is disclosed in U.S. Pat. No 5,029,692 to Warkentin. The "kicker" comprises a lever at one side of the cup, pivoted at the side of the cup which extends to form part of the base of the cup. By pushing down or up on the lever the produce in the cup may be ejected from the cup. Disadvantages of this system are that depending upon the placement of the fruit within the cup, the action of the kicker can cause fruit to be catapulted from the cup rather than tipped as is the preferred method as well as the kicker resulting in bruising to the fruit. Also, it has been found that the shape of the member which comes in contact with the fruit has caused problems as if it is too small, the produce may be moved to either side of the member without being ejected from the cup. These devices have allowed ejection only to one side of the conveyor thereby limiting the overall performance of the grading system. With one sided ejection, in a case when fruit in consecutive carriers are destined for the same station, the chances are high that a collision could occur, bruising the fruit.

A further device comprises a variation to the mechanism of the previously mentioned back-ripping system where the produce is dropped to one side of the cup. This one sided limitation as has been previously mentioned reduces the overall performance of the system as only one side of the conveyor chain is being utilised to, for example, accept fruit for packaging.

The accuracy of weight measurements in many prior art cups has also been of concern. While it is possible to have a video camera image of a piece of fruit used to estimate the weight of substantially round produce, irregular shaped produce must be rotated to obtain more shape information. Other systems use load cells with an arrangement whereby the cups are passed over the sensor to cause a voltage impulse waveform, indicative of the weight of the fruit, to be output by the load cell. In order to accurately determine the weight of the fruit it is necessary to allow sufficient time to pass between adjacent cups so that the individual impulses are recognisable and that the cup mechanism is capable of allowing the fruit to be weighed without the added effects of the conveyor belt system. These added effects include vibration from the system operation and the weight of the cup and conveyor system being mistakenly combined with the fruit weight.

Some prior art conveyor systems require a length of rollers to be fitted at the beginning of the chain to be used as a "singulator" whereby a process is undertaken which attempts to ensure that only one piece of fruit is placed in each grading cup, An example is disclosed in U.S. Pat. No. 3,627,117 to Whiteford. This process may set a slow speed for the system in addition to requiring that the number of cups and the length of the conveyor system be extended.

DISCLOSURE OF THE INVENTION

It is, therefore, an object of the present invention to provide an article support means for an article grader which goes some way towards overcoming the above disadvantages or which at least provides the public with a useful choice.

Accordingly in one aspect, the invention consists in an article support means for an endless conveyor article grading apparatus, said support means comprising: article receptacle means and mounting means, said mounting means normally mounting said article receptacle means so that it is in a substantially horizontal plane but upon the application of an external force will allow the article receptacle means to fall to either side of the mounting means to thereby discharge any article held therein depending on to which side of the article receptacle means said force is applied.

In a second aspect the invention consists in an article support means for an endless conveyor article grading apparatus, said support means comprising a conveyor engaging means, article receptacle means and mounting means, said mounting means normally mounting said article receptacle means so that it is in a substantially horizontal plane but upon the application of an external force will allow the article receptacle means to fall to either side of the mounting means to thereby discharge any article held therein depending on to which side of the article receptacle means said force is applied and further comprising a U-shaped yoke having two extending arms with a rotatable contoured roller disposed therebetween and having a back plate positioned parallel to the axis of said contoured roller, said contoured roller and said back plate forming a "cup" for receiving articles.

In this specification various equivalent terms have been used with equivalences as indicated below;
   article receptacle means: "cup"
   conveyor engaging means: coupling means
   horizontal position holding means: corner recesses
   slidable guiding means: guiding surfaces
   article support means: "fruit cup", fruit carrier, carrier
   conveyor: chain

BRIEF DESCRIPTION OF THE DRAWINGS

The invention consists in the foregoing and also envisages constructions of which the following gives examples.

One preferred form of the present invention will now be described with reference to the accompanying drawings in which;

FIG. 5 is an elevation showing only the tri-state mounting means of the present invention.

BEST MODE FOR CARRYING OUT THE INVENTION

Figure 1:
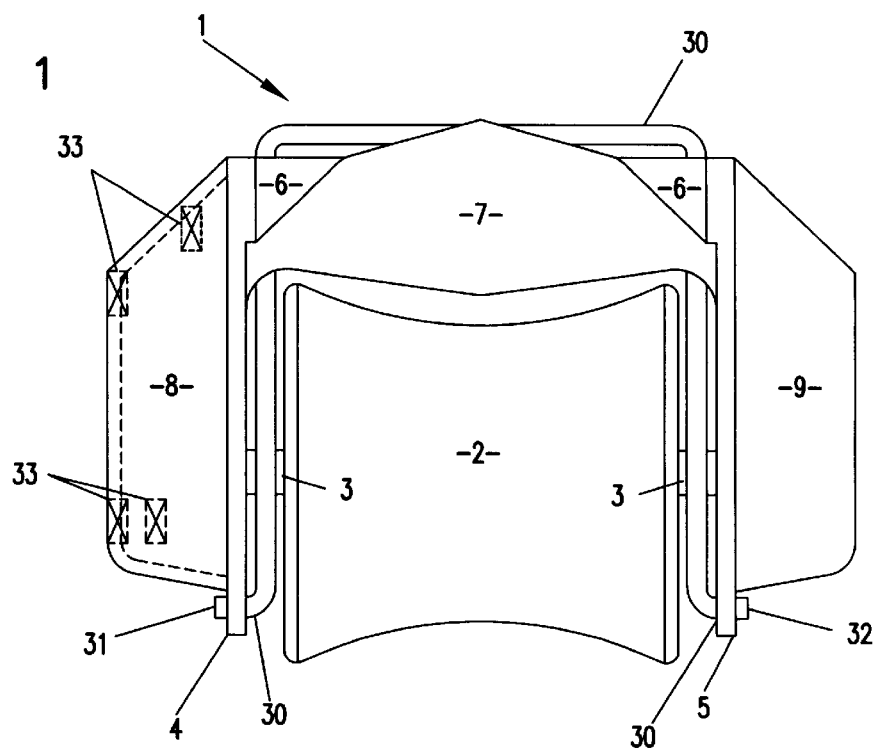
FIG. 1 is a plan elevation of the fruit cup of the present invention.

With reference to the drawings, FIG. 1 shows a carrier for supporting items of produce to be sorted/graded/packing generally referenced 1, A roller 2 which is preferably a bow tie roller has a shaft 3 connected at one end to arm member 4 and at its opposite end to arm member 5. Arm members 4 and 5 being joined at one end by connecting member 6 so that said arm members (4 and 5) and said connecting member 6 are arranged substantially in a U shaped yoke configuration which lies substantially in a horizontal plane when in use in the normal operating position. Connecting member 6 has formed therein a back plate 7 which is contoured to allow a substantially spherical or spheroidal object, such as an apple, to be supported in the region between back plate 7 and roller 2, extending downwardly from connecting member 6 is shaped member 20 the function of which will be described later in this description. Extending wing 8 is attached to arm member 4 and extending wing 9 is attached to arm member 5. Extending wings 8 and 9 each having weight points 33 on their undersides.

The foregoing description of interconnected parts defines a first individual piece of the fruit carrier 1 which may be generally referred to as the article receptacle means.

Figure 2:
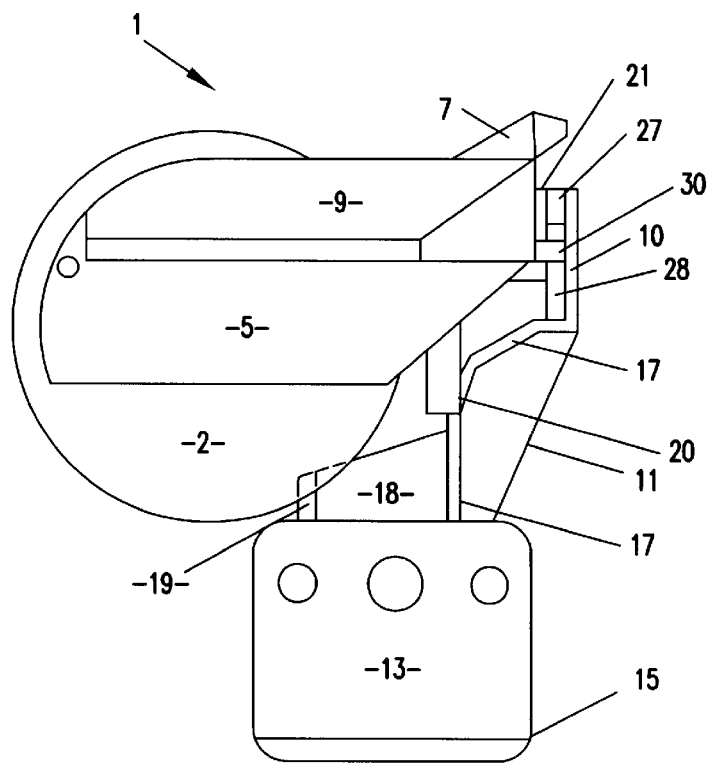
FIG. 2 is a side elevation of the fruit cup of FIG. 1.
Figure 3:
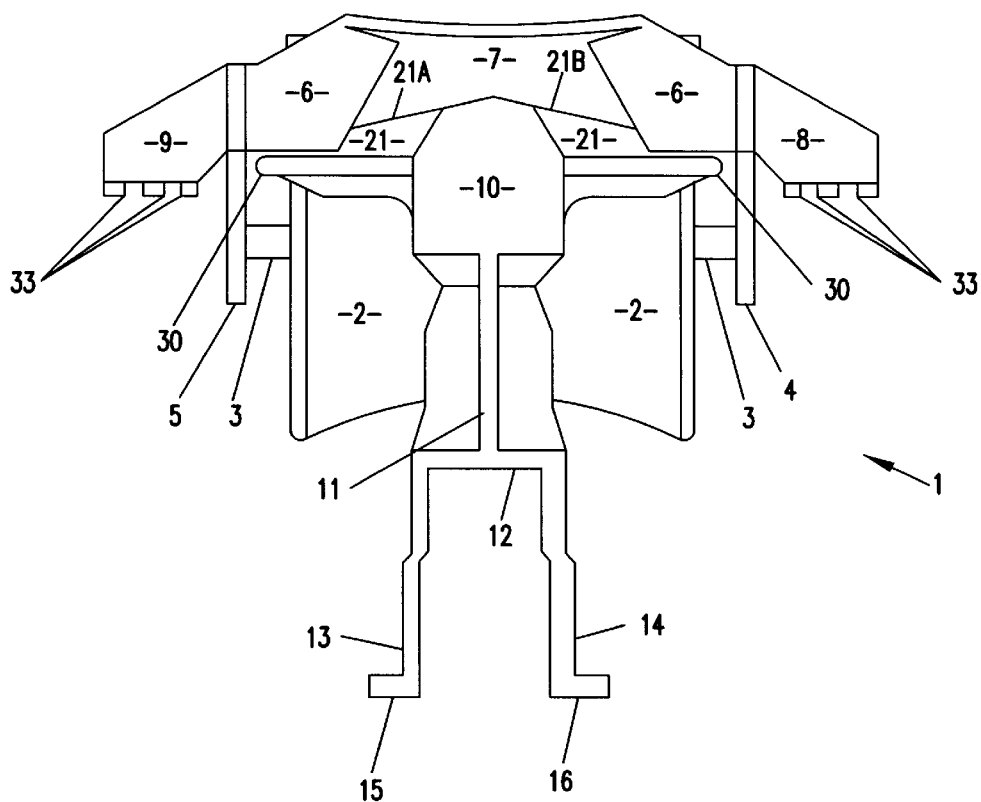
FIG. 3 is an end elevation of the fruit cup of FIG. 1.

With reference to FIGS. 2, 3 and 5 a second individual piece of the fruit carrier 1 will now be described which may be generally referred to as the tri-state mounting means. A plate 10 is shown supporting rib 11 extending therefrom to a top wall 12 of a coupling means. The coupling means also includes side walls 13 and 14, each side wall having three circular holes formed therein. Side wails 13 and 14 extend from the top wall 12 to respective feet members 15 and 16. Extending symmetrically, perpendicularly from supporting rib 11 is shaped rib 17 which extends from plate 10 to intersect top wall 12 of the coupling means. Following in the plane of supporting rib 11 is thin bracing rib 18 which joins shaped rib 17 to governing member 19 which is as shown in FIG. 5 shaped as a trapezium. It can also be seen from FIG. 5 that shaped rib 17 has a substantially trapezium shaped head which in use is covered by previously described shaped member 20, shaped member 20 having therein a correspondingly shaped receiving region to allow shaped member 20 to partially cover the trapezium shaped head of shaped rib 17.

Figure 4:
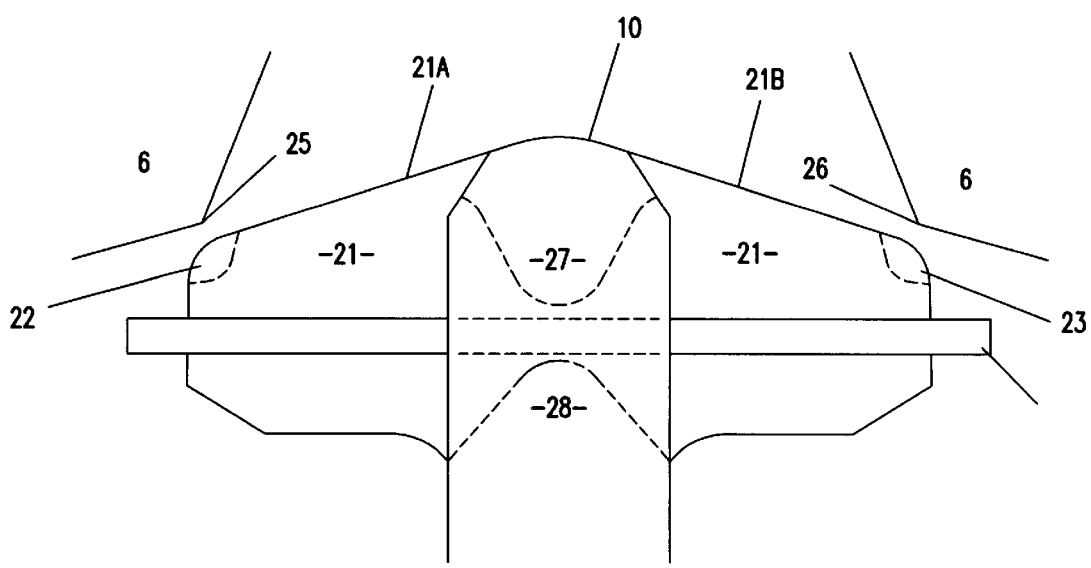
FIG. 4 is a detailed elevation of the guiding mechanist of the fruit cup of FIG. 1.

With reference now to FIG. 4, it can be seen that plate 10 is connected to member 21. Member 21 having corner recesses 22 and 23 provided to accept corners 25 and 26 respectively of connecting members 6, Member 21 also having moulded therein downward extending V shaped raised area 27 and upward extending V shaped raised area 28. V shaped areas 27 and 28 providing an open channel between plate 10 and member 21. Guiding surfaces 21A and 21B are also provided on member 21.

The previously described article receptacle means and just described tri-state mounting means comprise two independent pieces of the present invention. These two pieces are connected together by pivot member 30 which may be seen in FIGS. 1, 3 and 4. Pivot member 30 is of a substantially U shape and is preferably constructed from a light yet strong metal or plastics material. Ends 31 and 32 of pivot member 30 pass through holes in arm members 4 and 5 respectively. Pivot member 30 is thus rotatable about an axis through said holes in arm members 4 and 5. The U shaped pivot member 30 is further passed through the open channel between V shaped areas 27 and 28 in member 21 and is free to move both in a plane parallel to the member 21 as well as being rotatable in that plane around the pivot formed by the intersection of upper extending V shaped area 28 in connecting member 6 and pivot member 30.

In use, the apparatus of the present invention is connected to a conveyor system which preferable comprises an endless chain. The present invention is attached to the chain by placing side walls 13 and 14 of the coupling means astride one link in the chain so that the holes in side walls 13 and 14 may be used to pass dowels which also pass through corresponding holes in the link A series of carriers may be attached to the chain so as to build up an endless series. A number of adjacent chains may be used in a grading/sorting/packaging operation with each carrier being independently operable.

A controller, which may comprise a computer, controls the operation of the grading/sorting/packaging system, which could either include weighing or imaging to size the fruit. The normal operating position of the present invention is with pivot member 30 resting on upward extending V shaped area 28 with corners 25 and 26 of connecting member 6 sitting in recesses 22 and 23 respectively of member 21. With the conveyor system moving, produce (for example, fruit) are caused to enter the carriers. A section at the beginning of the conveyor system may be used as a "singulator" which has the purpose of ensuring that only one apple is carried by each carrier. This function may be carried out by causing roller 2 be raised and to rotate in a predetermined direction which has been found to have the desired effect of ejecting superfluous fruit. The fruit is at this stage supported between the rollers of consecutive carriers. The ejected fruit are then recycled or moved to a following empty cup.

In an imaging system, with the singulator section having ensured one piece of fruit per cup, a video camera could then be used to analyze the fruit. The rollers 2 could then be rotated so that multiple views of the fruit could be taken, this is especially important for produce with a non-spherical shape.

Alternatively, in a weighing system, the cups are then passed over a weighing section which preferably comprises load cells used to determine the weights of each individual piece of fruit. In order to obtain this weight information whilst the fruit is still in the carrier, the extending arms 8 and 9 are guided onto a load sensing section where the article receptacle means are lifted from their resting place on the tri-state mounting means by an upward force applied to weight points 33 below each of extending wings 8 and 9. The article receptacle means are pivotable in a vertical plane by the action of pivot member 30 against V shaped areas 27 and 28 and is able to substantially "float" in this vertical plane for weighing purposes. The article receptacle means is then substantially free from the effects of the conveyor system (that is free from vibration and the weight of the chain) and the contents of the cup may then be weighed.

In a weighing system in which singulation is not required, the roller 2 may be removed from the article receptacle means. In this embodiment, the vertical height of the carrier would be substantially reduced. A shaped plate cup could be used in the place of the roller which could be an extension of back plate 7, the cup being connected to the tri-state mounting means and having the ability to tip as will soon be described. It may be preferable to omit the roller 2 in systems where the item to be carried would produce a residue capable of becoming lodged in parts of the roller mechanism possibly increasing fatigue or promoting ill health (for example, chicken pieces).

With the individual pieces of fruit having been weighed, the control system controlling the operation then decides where each piece is to be sent so that each piece may be ejected from the cup at the desired place along the conveyor. This is accomplished by providing an upward tipping force to the underside of either of extending wings 8 or 9 (depending which direction the carrier is to be tipped). This force is applied, for example, by computer controlled solenoid rams. The fruit is ejected to the side opposite that which the upward tipping force was applied, perpendicular to the direction of travel. It has been found that the design of the present invention has resulted in stability in its normal operating position. Upon entry to the carrier the fruit may exert forces upon any surface of the carrier without causing tipping, while only a small upwards tipping force is required to tip the carrier. Extending wings 8 or 9 guide the contents from the carrier, reducing bruising in the case of sensitive contents.

When the carrier is tipped, corners 25 or 26 (depending on the direction of tipping) are caused to slip from their temporarily stable positions in recesses 22 and 23 respectively along guiding surfaces 21A or 21B. The loose coupling between shaped rib 17 and shaped member 6 slips upon tipping and pivot member 30 slides and rotates in the plane of plate 10 in response to the weight of the article receptacle means moving position. This sliding action means that the contents of the carrier are shifted sideways rather than being dropped. The carrier is restrained to only tip as far as governing member 19 will allow before roller 2 contacts governing member 19. The carrier is returned to its upright position once the conveyor system returns the carrier to the point where they are filled. Usually this is accomplished by a section wherein the carrier is transported upside down. Upon returning to their upright positions, the cups may be guided so that the article receptacle means once again sits in its temporary stable position on the tri-state mounting means as previously described.

The present invention, by having the ability to tip the contents to either side of the conveyor system is expected to increase the efficiency of grading/packing/sorting lines by allowing greater flexibility. Also, the present invention is compatible with both imaging systems (because the roller rotates the fruit to give multiple views) and weighing systems (because the carrier is stable with minimum external forces). By unloading to both sides of a conveyor, it is possible to have more unloading points in a given length of conveyor. As the contents of the carriers of the present invention are shifted sideways rather than being "kicked" or dropped, improvements in fruit quality are expected as well as less wastage, formerly due to rough handling. The present invention is designed for use with many currently installed systems and so should be easily accepted without major conversions required. Also, the present invention, by incorporating a rotatable roller does away with the need to provide a section of conveyor to be used as a "singulator".

We claim:

1. An article support for an endless conveyor article grading apparatus, said support comprising:

article receptacle means; and mounting means on which said article receptacle means is mounted, said mounting means normally mounting said article receptacle means substantially horizontally so that, upon application of an external force to one of two sides of said article receptacle means, said article receptacle means falls to one of two sides of said mounting means, thereby discharging any article held in said article receptacle means.

2. An article support as claimed in claim 1 wherein said article receptacle means is pivotally mounted on said mounting means so as to permit the receptacle means to fall to either side of said mounting means.

3. An article support as claimed in claim 2 wherein said mounting means includes a guiding means to guide said article receptacle means as it falls to said one side of said mounting means from said horizontal plane.

4. An article support as claimed in claim 3 wherein said guiding means includes a downwardly depending inclined surface on each side of said mounting means engageable by said article receptacle means.

5. An article support as claimed in claim 4 wherein said article receptacle means includes edge portions, one of said edge portions engaging with a respective one of said downwardly depending inclined surfaces as the article receptacle means falls to said one of two sides.

6. An article support as claimed in claim 5 wherein each of said edge portions engages in a respective recessed portion provided for said mounting means to normally support said article receptacle means in said horizontal plane.

7. An article support as claimed in claim 1 wherein a pivot means connects said article receptacle means with said mounting means, said pivot means including a transverse portion extending through an aperture provided in said mounting means, said transverse portion of said pivot means being slideable within said aperture as said article receptacle means falls to one of said sides.

8. An article support as claimed in claim 7 wherein said aperture comprises a channel which includes a pivot portion about which said pivot means can pivot said article receptacle means when in said horizontal plane.

9. An article support as claimed in claim 8 wherein said pivot portion comprises a V-shaped area provided for said channel.

10. An article support as claimed in claim 9 wherein said pivot means is of a substantially U-shape, free ends of said pivot means extending away from said mounting means to engage on either side of said article receptacle means.

11. An article support as claimed in claim 10 wherein said pivot means is adapted to engage said article receptacle means so that said article receptacle means is raiseable from said mounting means so as to be disassociated from a conveyor connected to said mounting means.

12. An article support for an endless conveyor article grading apparatus, said support comprising:

article receptacle means; and mounting means, on which said article receptacle means is mounted, said mounting means normally mounting said article receptacle means substantially horizontally so that, upon application of an external force to one of two sides of said article receptacle means, said article receptacle means falls freely to one of two sides of said mounting means after removal of the external force and remains in a fallen position, thereby discharging any article held in said article receptacle means.

13. An article support as claimed in claim 12 wherein said extending arms each include a transversely extending wing portion, an underside of each wing portion providing an area of contact for said external force and an upper surface of each wing portion providing a surface along which an article can be guided as it is tipped out of the receptacle means.

14. An article support as claimed in claim 13 including means to raise said contoured roller into a rotatable supporting position for articles supported between adjacent raised contoured rollers of adjacent article support means.

15. An article support as claimed in claim 12 wherein said article receptacle means is pivotally mounted on said mounting means so as to permit the receptacle means to fall to either side of said mounting means.

16. An article support as claimed in claim 12 wherein a pivotal means connects said article receptacle means with said mounting means, said pivotal means including a transverse portion extending through an aperture provided in said mounting means, said transverse portion of said pivotal means being able to slide within said aperture as said article receptacle means falls to one of said sides.

* * * * *